United States Patent
Zhang et al.

(10) Patent No.: US 10,992,216 B2
(45) Date of Patent: Apr. 27, 2021

(54) LINEAR MOTOR

(71) Applicant: AAC Technologies Pte. Ltd., Singapore (SG)

(72) Inventors: Tao Zhang, Shenzhen (CN); Jinquan Huang, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 160 days.

(21) Appl. No.: 16/528,694

(22) Filed: Aug. 1, 2019

(65) Prior Publication Data
US 2020/0052565 A1 Feb. 13, 2020

(30) Foreign Application Priority Data
Aug. 9, 2018 (CN) .......................... 201821277809.9

(51) Int. Cl.
*H02K 33/12* (2006.01)
*B06B 1/04* (2006.01)

(52) U.S. Cl.
CPC .............. *H02K 33/12* (2013.01); *B06B 1/045* (2013.01)

(58) Field of Classification Search
CPC ............ H02K 5/00; H02K 5/22; H02K 5/225; H02K 7/00; H02K 7/06; H02K 7/063; H02K 11/00; H02K 11/33; H02K 33/00; H02K 33/12; H02K 33/18
See application file for complete search history.

(56) References Cited

U.S. PATENT DOCUMENTS

| 5,896,076 | A  | * | 4/1999 | van Namen | ......... | H01F 7/1615 |
| | | | | | | 335/229 |
| 2010/0102646 | A1 | * | 4/2010 | Masami | ................ | H02K 33/16 |
| | | | | | | 310/29 |
| 2011/0001385 | A1 | * | 1/2011 | Saito | ...................... | H02K 7/063 |
| | | | | | | 310/214 |

* cited by examiner

*Primary Examiner* — Tran N Nguyen
(74) *Attorney, Agent, or Firm* — W&G Law Group LLP

(57) ABSTRACT

Provided is a linear motor, including a housing having a receiving space; a vibrator and a stator received therein; an elastic member suspending the vibrator in the housing; and a circuit board. The housing includes a bottom cover and a shell covering the bottom cover and enclosing the receiving space together with the bottom cover. The stator includes an iron core fixed in the housing, a yoke sleeved on the iron core, and first and second coils provided on two sides of the yoke. The second coil is provided between the yoke and the bottom cover. The circuit board is fixed to the bottom cover. The vibrator includes a magnet spaced apart from the stator. The iron core is provided with a groove formed by recessing inwardly from a surface thereof. A coil lead of the first coil passes through the groove to be electrically connected to the circuit board.

6 Claims, 4 Drawing Sheets

LINEAR MOTOR

TECHNICAL FIELD

The present disclosure relates to the field of vibration motor technologies, and in particular, to a linear motor for portable consumer electronic products.

BACKGROUND

With the development of electronic technology, portable consumer electronic products such as mobile phones, handheld game consoles, navigation devices or handheld multimedia entertainment devices, etc., become more and more popular, which generally use vibration motors to do system feedback, such as call reminder, message reminder, navigation reminder of mobile phones, vibration feedback of the game console, etc.

A linear motor in the related art includes a housing having a receiving space, a vibrator, and a stator. The vibrator and the stator are received in the receiving space. The stator includes an iron core, a yoke sleeved on the iron core, a first coil and a second coil. The first coil and the second coil are respectively provided at two sides of the yoke. The vibrator includes a magnet spaced apart from the stator. A magnetic gap is formed between the iron core and the magnet. The first coil and the second coil are inserted into the magnetic gap.

However, with the linear motor of the related art, a coil lead of the first coil is connected to an external circuit after passing through the magnetic gap from outside of the first coil, thereby increasing the space required for the magnetic gap and reducing utilization rate of the space of the magnetic circuit.

Therefore, it is necessary to provide a new linear motor to solve the above drawbacks.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
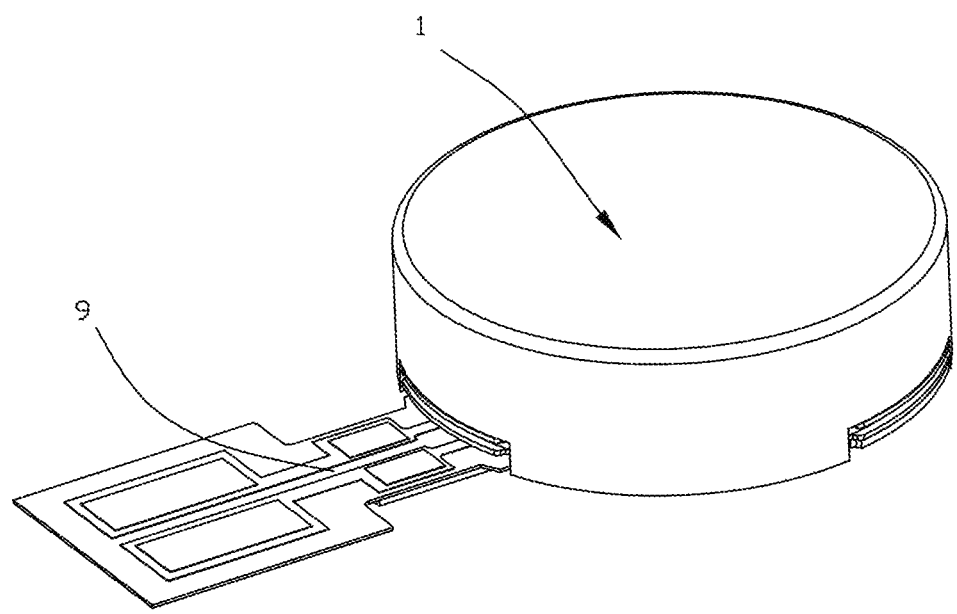
FIG. 1 is a perspective schematic structural view of a linear motor according to an embodiment of the present disclosure.
Figure 2:
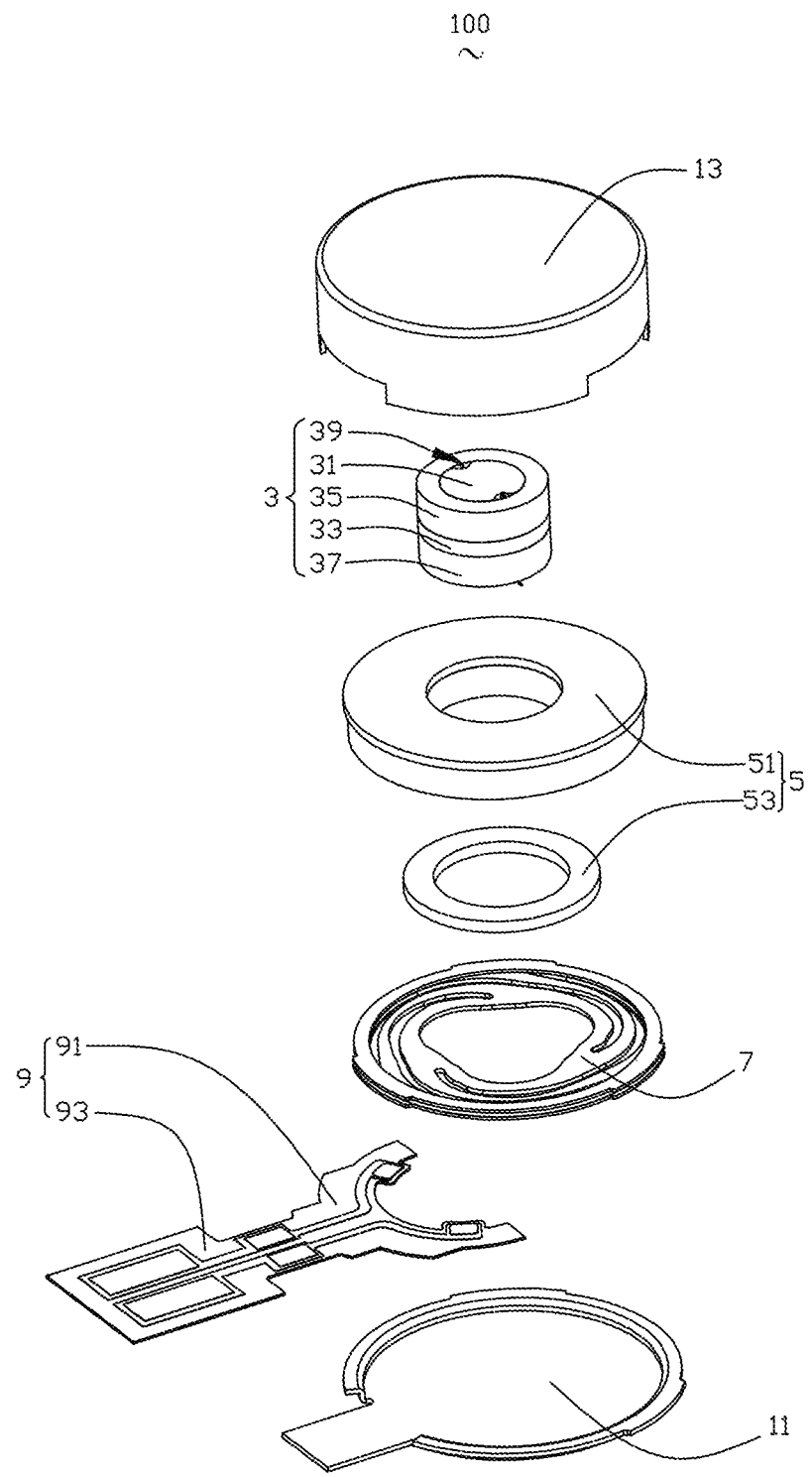
FIG. 2 is a perspective exploded schematic structural view of the linear motor shown in FIG. 1.
Figure 3:
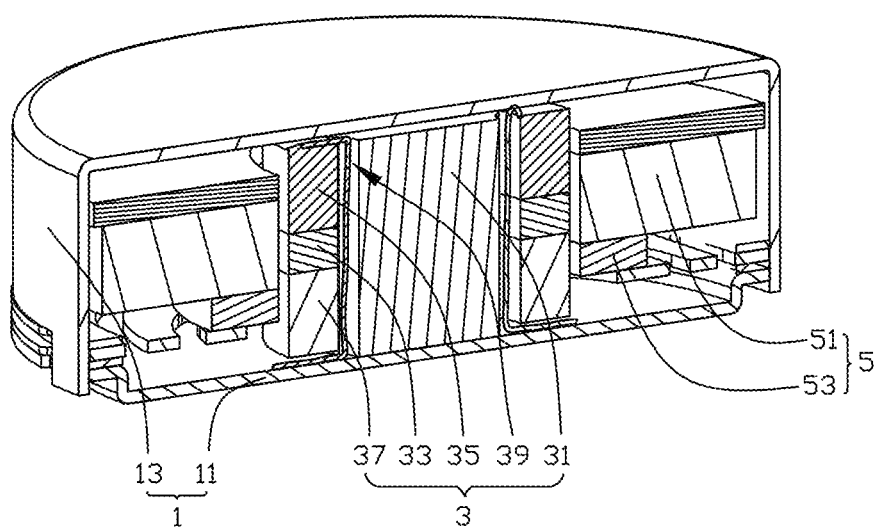
FIG. 3 is a cross-sectional view of the linear motor shown in FIG. 1.
Figure 4:
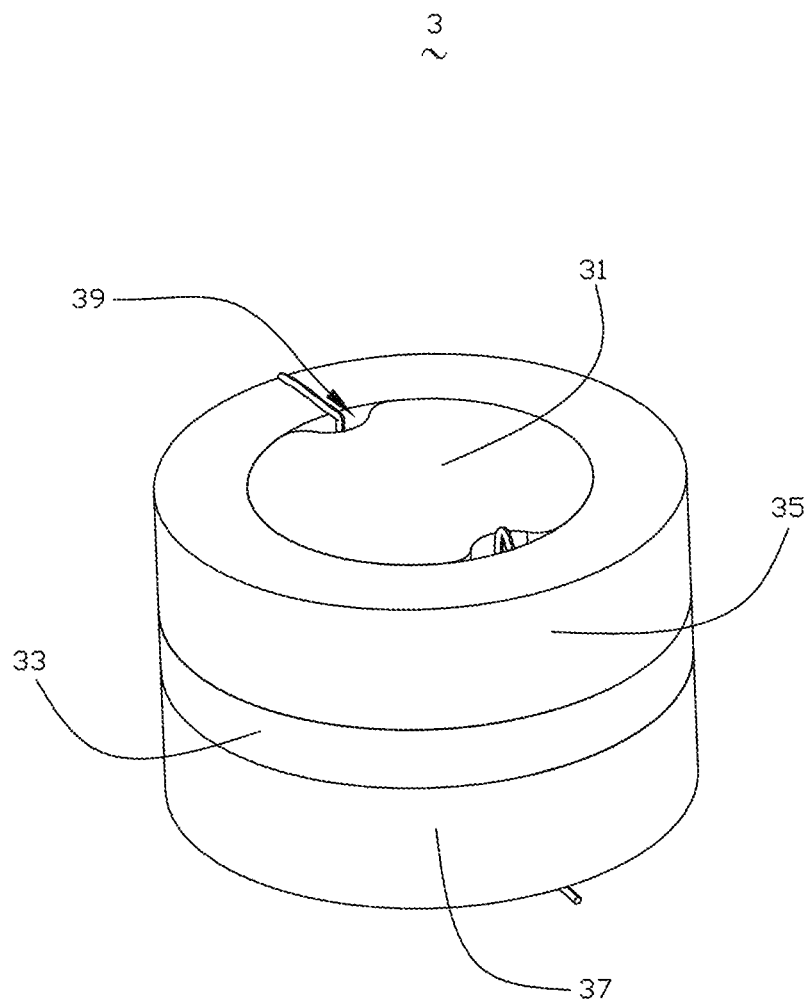
FIG. 4 is a perspective schematic structural view of a stator of a linear motor according to an embodiment of the present disclosure.

Referring to FIGS. 1 to 4, the linear motor 100 includes a housing 1 having a receiving space, a stator 3, a vibrator 5, an elastic member 7, and a circuit board 9. The stator 3 and a vibrator 5 are received in the receiving space. The elastic member 7 suspends the vibrator 5 in the housing 1.

The housing 1 includes a bottom cover 11 and a shell 13. The shell 13 covers the bottom cover 11 and encloses the receiving space together with the bottom cover 11.

The stator 3 includes an iron core 31 fixed in the housing 1, a yoke 33 sleeved on the iron core 31, a first coil 35 and a second coil 37. The first coil 35 and the second coil 37 are sleeved on the iron core 31 and respectively provided on two sides of the yoke 33. In an example, the second coil 37 is provided between the yoke 33 and the bottom cover 11.

The iron core 31 is provided with a groove 39 formed by recessing inwardly from a surface thereof. A coil lead of the first coil 35 passes through the groove 39 to be electrically connected to the circuit board 9. Optionally, the groove 39 has an arc shape.

The iron core 31 is provided with the groove 39 formed by recessing inwardly from the surface thereof, so that the coil lead of the first coil 35 can pass through the groove 39 to be connected to the circuit board 9, thereby avoiding that the coil lead of the first coil 35 enters the magnetic gap. Therefore, the space occupied by the magnetic gap is reduced and utilization rate of the space of the magnetic circuit is improved.

The iron core 31 has a cylindrical shape. This is not a limitation for the present disclosure. The iron core 31 can be designed in a square column shape or the like according to actual requirements.

Two grooves 39 are provided. The two grooves 39 are symmetrically provided with respect to a central axis of the iron core 31. Correspondingly, two coil leads are provided for the first coil 35. The two coil leads respectively pass through the two grooves to be connected to the circuit board 9. By providing two grooves 39 and symmetrically providing the two grooves 39 with respect to the central axis of the iron core 31, the magnetic circuit loss can be effectively reduced, and the reliability of the linear motor 100 can be increased.

The vibrator 5 includes a magnet 51 spaced apart from the stator 3, and a weight 53 sandwiched between the magnet 51 and the elastic member 7.

The magnet 51 is spaced apart from the iron core 31 to form a magnetic gap. The yoke 33, the first coil 35 and the second coil 37 are inserted into the magnetic gap.

The weight 53 has an annular shape and has a smaller diameter than the magnet 51, and is used for enhancing the stability of the linear motor 100.

The circuit board 9 is fixedly connected to the bottom cover 11. In an example, the circuit board 9 includes a first portion 91 and a second portion 93. The first portion 91 is sandwiched between the elastic member 7 and the bottom cover 11, and electrically connected to the coil lead of the first coil 35. The second portion 93 is connected to the first portion 91 and extends out of the receiving space. The second portion 93 is used for connection with an external electrical appliance.

Compared with the related art, with the linear motor provided by the present disclosure, the iron core is provided with a groove formed by recessing inwards from the surface, so that the coil lead of the second coil can pass through the groove to be connected to the circuit board, thereby avoiding that the coil lead enters the magnetic gap and thus reducing the space occupied by the magnetic gap and improving the utilization rate of the space of the magnetic circuit. By providing two grooves and symmetrically providing the two grooves with respect to the central axis of the iron core, the magnetic circuit loss can be effectively reduced, and the reliability of the linear motor can be increased.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A linear motor, comprising:
a housing having a receiving space;
a vibrator received in the receiving space;
a stator received in the receiving space;
an elastic member suspending the vibrator in the housing; and
a circuit board,
wherein the housing comprises a bottom cover and a shell, the shell covers the bottom cover and encloses the receiving space together with the bottom cover,
the stator comprises an iron core fixed in the housing, a yoke sleeved on the iron core, and a first coil and a second coil that are respectively provided on two sides of the yoke, the second coil being provided between the yoke and the bottom cover,
the circuit board is fixed to the bottom cover,
the vibrator comprises a magnet spaced apart from the stator, the iron core is provided with a groove formed by recessing inwardly from a surface thereof, and a coil lead of the first coil passes through the groove to be electrically connected to the circuit board.

2. The linear motor as described in claim 1, wherein the iron core has a cylindrical shape; said groove includes two grooves are provided, and the two grooves are symmetrically arranged with respect to a central axis of the iron core; and two coil leads are provided, and the two coil leads pass through the two grooves respectively.

3. The linear motor as described in claim 1, wherein said groove is in an arc shape.

4. The linear motor as described in claim 2, wherein of said two grooves is in an arc shape.

5. The linear motor as described in claim 1, wherein the circuit board comprises a first portion and a second portion; the first portion is sandwiched between the elastic member and the bottom cover and electrically connected to the coil lead of the first coil, and the second portion is connected to the first portion and extends out of the receiving space.

6. The linear motor as described in claim 1, wherein the vibrator further comprises a weight sandwiched between the magnet and the elastic member.

* * * * *